United States Patent
Rossner et al.

[11] Patent Number: 5,518,659
[45] Date of Patent: May 21, 1996

[54] METHOD FOR MANUFACTURING A PHOSPHOR HAVING HIGH TRANSLUCENCY

[75] Inventors: Wolfgang Rossner, Holzkirchen; Hermann Boedinger, Puchheim; Juergen Leppert, Inning; Christa Grabmaier, Berg, all of Germany

[73] Assignee: Siemens Aktiengesellschaft, Munich, Germany

[21] Appl. No.: 378,404

[22] Filed: Jan. 26, 1995

[30] Foreign Application Priority Data

Jan. 26, 1994 [DE] Germany ............... 44 02 258.1

[51] Int. Cl.⁶ .................................................. C09K 11/84
[52] U.S. Cl. .................... 252/301.4; 423/263; 423/518
[58] Field of Search .................. 252/301.45; 423/263, 423/518

[56] References Cited

U.S. PATENT DOCUMENTS 5,296,163  3/1994  Leppert et al. .............. 252/301.45

FOREIGN PATENT DOCUMENTS 3629180  3/1987  Germany.
2-209987  8/1990  Japan.

*Primary Examiner*—Melissa Bonner
*Attorney, Agent, or Firm*—Hill, Steadman & Simpson

[57] ABSTRACT

In an improved method for manufacturing a phosphor ceramic on the basis of a rare earth oxisulfide, a phosphor powder having a high specific surface of more than 10 m² per gram is employed and is compressed to form a high-density, optically pure and translucent ceramic by single-axis hot-pressing under a reducing atmosphere.

10 Claims, 1 Drawing Sheet

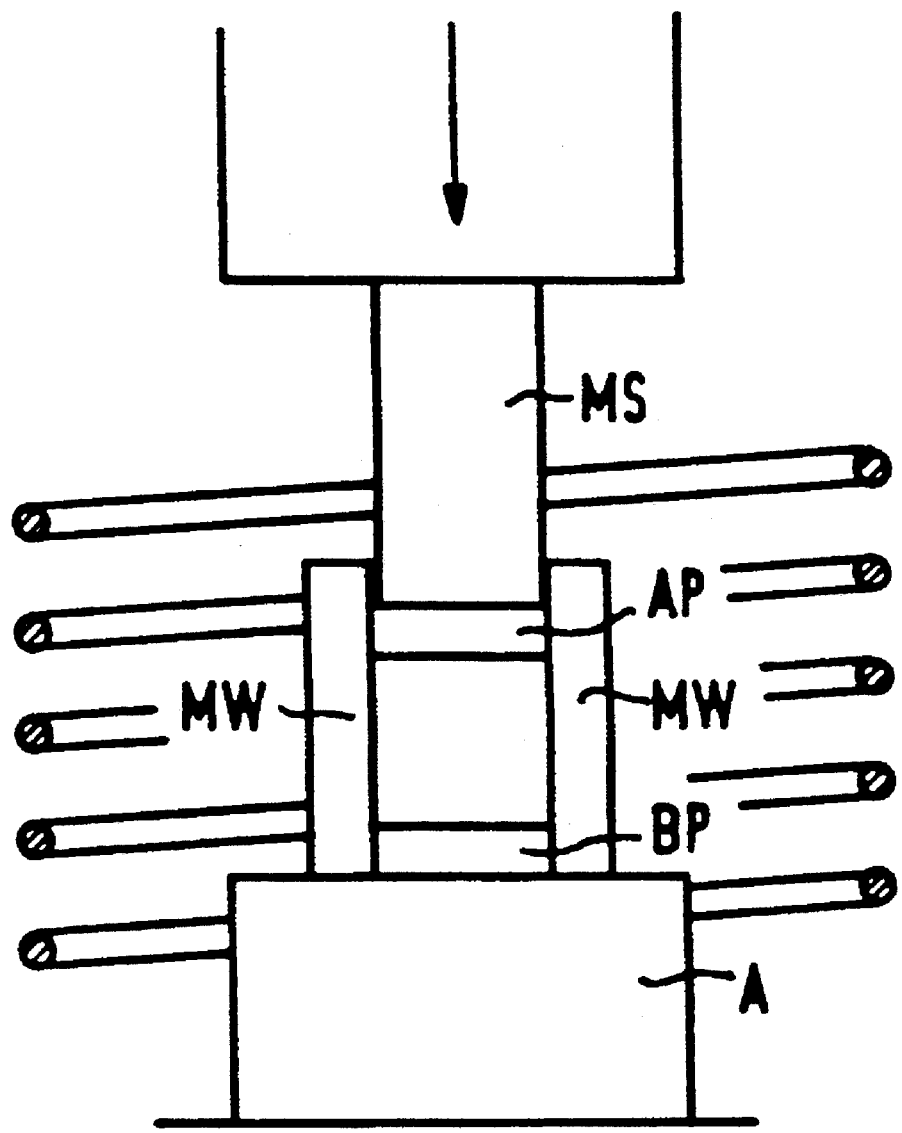

METHOD FOR MANUFACTURING A PHOSPHOR HAVING HIGH TRANSLUCENCY

BACKGROUND OF THE INVENTION

1. Field of the Invention

The present invention relates to a phosphor of a type suitable for use in a detector for high-energy radiation, such as x-rays.

2. Description of the Prior Art

Detectors can be constructed of a phosphor and a photodiode or, respectively, a photomultiplier for detecting high-energy radiation. Such detectors are widely employed in nuclear medicine and in x-ray diagnostics. The function of the phosphor is to absorb the high-energy radiation and to emit visible light as a consequence of this absorption. This visible light can be detected by a photosensitive element, for example a photodiode, a photomultiplier or a light-sensitive film.

In modern radiation detectors as employed, for example, in x-ray computed tomography, phosphors having only an extremely slight afterglow are required in order to achieve an adequately high read-out frequency. A phosphor in widespread use is thallium-doped cesium iodide (CsI:Tl), but this phosphor still exhibits an afterglow intensity of approximately $10^{-2}$ through $10^{-3}$ of the initial light intensity, at a time, for example, of 20 msec after the high-energy irradiation of the phosphor has ceased. Phosphors whose afterglow has decayed to less than $10^{-4}$ of the initial intensity after approximately 5 through 10 msec, however, are required for state of the art radiation detectors.

The oxisulfides of the rare earths are considered to be promising phosphors for employment in modern radiation detectors. German OS 36 29 180 discloses a method for manufacturing a phosphor ceramic having the general composition $(Ln_{1-x-y}M_xCe_y)_2O_2S:X$ with Ln=Gd, La or Y; M=Eu, Pr or Tb and X=F or Cl with $0<(x,y)<1$. The pigment powder employed as initial material is thereby filled into a vacuum-tight metal container and is compressed to form a ceramic by isostatic hot-pressing.

A modified method is disclosed in U.S. Pat. No. 5,296,163 corresponding to German Patent Application P 42 24 931.7. Therein, a rare earth sulfite is precipitated from solution and is subsequently reduced to form oxisulfide. The pigment powder obtained in this way has a high specific surface of more than 10 $m^2$/g (according to BET) and can be compressed to form a translucent phosphor ceramic having high density and good phosphorescent properties on the basis of a simple, single-axis hot-pressing process.

A disadvantage of this method is the high reactivity of the pigment powder caused by the high specific surface thereof and the high reactivity of the as yet incompletely compressed phosphor ceramic, so that a surface oxidation to form rare earth oxisulfate is virtually impossible to prevent as a practical matter given technical handling of the pigment powder. The presence of surface oxidation prevents the formation of an optimum microstructure during hot-pressing and leads to the creation of secondary phases of oxisulfate that in turn reduce the luminescent intensity.

SUMMARY OF THE INVENTION

It is an object of the present invention to improve a method for manufacturing a rare earth oxisulfide so as to produce a phosphor having a lesser afterglow, higher translucency and increased luminescent intensity in comparison to phosphors obtained by conventional manufacturing methods.

The above object is achieved in accordance with the principles of the present invention in a method for manufacturing a phosphor ceramic having the general sum formula identified below by preparing a phosphor powder having a composition as specified by the general sum formula and having a specific surface (measured with a gas adsorption method according to BET) of at least 10 $m^2$/g, and single-axis hot-pressing the phosphor powder in a pressing dye at a pressure in a range from 0.1 through 10 kn/cm$^2$ and a temperature in a range of from 1000° through 1500° C. in a reducing atmosphere at a gas pressure in a range from 0.1 Pa through 0.1 MPa.

Phosphors of the rare earth oxisulfides having the general sum formula $(M_{1-x}Ln_x)_2O_2S$ can be produced with the method of the invention, M comprising at least one element of the group Y, La and Gd, Ln standing for one or more elements of the group Eu, Ce, Pr, Tb, Yb, Dy, Sm and Ho, and wherein $(2\times10^{-1})\geq x\geq(1\times10^{-6})$.

Ln preferably stands for Ce and at least one further element from the recited group, preferably Tb, Pr or Eu.

The phosphor ceramic of the invention can be utilized in imaging methods, for example in x-ray computed tomography.

Setting reducing conditions during the heating and/or compressing of the phosphor powder during hot-pressing is important to the method of the invention. Suitable atmospheres, for example, are forming gas (N$_2$/H$_2$=95/5, 90/10, 80/20 or compositions lying therebetween), hydrogen, hydrogen sulfide, carbon monoxide and other reducing gases or mixtures of reducing gases.

The compressing ensues at reduced gas pressure. This can be held constant during the entire compression of the phosphor powder. Preferably, however, the gas pressure is set or varied dependent on the degree of compression achieved. As a rule, the gas pressure will be set to a minimum during the phase of longest or fastest compression (for example, between 600° and 1000° C.), whereas it can be selected higher relative thereto before and/or thereafter.

The method disclosed in U.S. Pat. No. 5,296,163 can be employed, for example, for manufacturing the phosphor powder. The metals are thereby placed in solution in the desired ratio in an oxidized form as hydrogen sulfite complex and are then precipitated as sulfites. In a further step, a reduction of the sulfites to form the desired oxisulfides is then required. To that end, the sulfite powder obtained by precipitation is reduced to oxisulfide in a furnace in a forming gas atmosphere. The precipitation of the phosphor powder from solution has the advantage that the dopings contained to only a slight proportion are uniformly distributed over the entire powder. This guarantees the manufacture of a phosphor ceramic having properties that are uniformly distributed throughout the ceramic body.

In the method disclosed in U.S. Pat. No. 5,296,163, the phosphor powder is subsequently treated in a further tempering step in a hydrogen/sulfur vapor atmosphere. A phosphor powder can thereby be obtained that has absolutely no inclusions of foreign phases and that has a large specific surface of more than 10 $m^2$ per gram (according to BET) in addition to comprising an exact stoichiometry. It is only with this large surface that a high density of 96% and more referred to the theoretical, maximum density can be obtained during compression. Only then does the phosphor have the required, high optical purity and translucency for an imaging method.

DESCRIPTION OF THE DRAWING

The single FIGURE is a schematic representation of a hot-pressing apparatus used in the method of the invention.

DESCRIPTION OF THE PREFERRED EMBODIMENTS

A phosphor powder having the gross composition $(Gd_{1-x}Tb)_2O_2S$ is to be produced, wherein x=0.02. To that end, one proceeds according to the method disclosed in U.S. Pat. No. 5,296,163. First, a suitable gadolinium compound such as, for example, gadolinium oxide $Gd_2O_3$ is converted into a hydrogen sulfite complex:

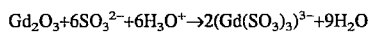

To that end, sulfur dioxide is introduced into the aqueous suspension of the $Gd_2O_3$. A clear solution of the hydrogen sulfite complex arises.

This solution is pumped through a 0.2 µm filter in order to remove particles. The dopant additive for terbium that is still lacking can now be added at this stage in the proper ratio prescribed by the formula. The addition preferably ensues as a solution or suspension of the corresponding oxides, sulfides, chlorides, nitrates, carbonates or other suitable compounds of the metals or dopants.

The sulfur dioxide is now expelled from the solution, whereby the gadolinium together with the dopant completely precipitates from the solution as sulfite:

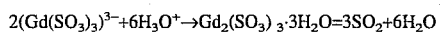

The entire process, particularly, the handling of the solid powder, ensues in an inert gas atmosphere of or in a reducing atmosphere in order to prevent an oxidation of the hydrogen sulfite complex or, later, of the solid sulfite, to form a sulfate.

The dried gadolinium sulfite powder is now heated to, for example, 700° in a reducing atmosphere, for example an atmosphere of forming gas having the composition 80% $N_2$/20% $H_2$. The gadolinium sulfite is thereby reduced to form gadolinium oxisulfide $Gd_2O_2S$.

The reduction of the gadolinium sulfite can alternatively be undertaken using other gases having a reducing effect, for example by introducing carbon monoxide, hydrogen or forming gas having some other composition. The temperature required for reduction can also be arbitrarily selected between 400° and 800° C. The phosphor powder obtained in this way has a desired, high specific surface of, for example, 35 m²/g. It may, however, still have inclusions of foreign phases that do not meet the recited gross sum formula. This is particularly observed when, in a version of the method, pure gadolinium oxisulfide is produced and is only subsequently mixed with suitable compounds of the dopants. A further reduction step can be implemented in this case for completing the stoichiometry, the obtained phosphor powder being exposed to a hydrogen/sulfur vapor atmosphere therein. The same thermal conditions as in the first reduction step are thereby selected.

The size of the crystallites of the phosphor powder obtained as defined by x-ray diffractometry at this stage amounts to 10 through 20 nm.

The phosphor powder is now filled into a pressing die for compression. This pressing die can be composed of $Al_2O_3$, Ta, W, SiC or $Si_3N_4$.

The figure shows an apparatus that is suitable for hot-pressing. The pigment powder is filled into the pressing die that is composed of bottom plate BP, die wall MW and cover plate HP and that, for example, is cylindrical. The pressing power is hydraulically produced and acts on the cover plate AP with the die punch MS. The die thereby rests on an anvil A. A heater H surrounding the pressing die as well as a system (not shown) for producing a reducing atmosphere at reduced residual gas pressure complete the hot-press arrangement.

Pre-pressing is first carried out cold and dry in the hot press at a pressure of 0.1 through 10 kNcm⁻². Subsequently, heating can be optionally carried out initially pressure-free to a temperature of 1100° through 1300°, whereby the phosphor powder sinters to approximately 80 through 85% of the theoretical density. Alternatively or thereafter, the ultimate pressing power of approximately 0.1 through 20 kNcm⁻² is built up and the phosphor powder is completely compressed to form a phosphor ceramic.

Various temperature/time profiles can be set for the implementation of the method. It is likewise possible to vary the residual gas pressure of the reducing atmosphere at which the phosphor powder is kept during the hot-pressing dependent on the degree of compression.

In a first embodiment of the invention, the phosphor powder is heated with a constant rate in the hot press up to the maximum temperature that lies between 1100° and 1500° C., preferably between 1200° and 1300° C. A rate of 1 through 5K/minute, preferably of 3 through 4K/minute is set. The gas pressure of the reducing atmosphere can thereby be kept constant at a pressure of 0.1 through 10⁵ Pa, preferably at a pressure of 5 through 100 Pa. A holding time of 30 through 240 minutes, preferably of 60 through 120 minutes is observed at the maximum temperature and cooling of the resulting hot-pressed product is subsequently carried out. The cooling rates are set to 3 through 10K/minute, preferably to 4 through 5K/minute.

In a second embodiment of the invention, heating is first carried out up to a temperature between 700° and 1000° C., preferably between 750° and 900° C., given a gas pressure of 0.1 through 50 Pa, preferably 1 Pa through 5 Pa. Subsequently, the gas pressure is raised to 500 Pa through 0.1 MPa, preferably to 0.01 MPa through 0.1 MPa. Subsequently, heating is continued up to the maximum temperature, as in the first version, the holding time is observed and cooling is subsequently undertaken.

In a third version, heating is first carried out to an intermediate temperature of 600° through 800° C., preferably 650° through 700° C., given a gas pressure of 200 Pa through 0.1 MPa, preferably given a pressure of 0.05 MPa through 0.1 MPa. The gas pressure is then lowered to a value of 0.1 Pa through 50 Pa, preferably to a value of 1 Pa through 5 Pa, and heating is subsequently continued to a second temperature of 900° C. through 1100° C., preferably between 950° C. and 1050° C. After this temperature has been reached, the gas pressure is again raised and set to a pressure of 200 Pa through 0.1 MPa, preferably to 0.05 MPa through 0.1 MPa. Subsequently, heating is carried out up to the maximum temperature, as previously, and the temperature is held followed by cooling.

By setting a minimum gas pressure during the compression process, which mainly occurs in the temperature interval from 700° through 1000° C., particularly between 750° and 900° C., no gases can be enclosed in the pores of the arising phosphor ceramic body. As a result, a complete compression of the phosphor powder is possible.

In a further embodiment of the method of the invention, holding times of a maximum of 120 minutes given a constant temperature can be observed in all versions immediately before or during said greatest compression. In the first version, the temperature holding time is inserted when a temperature between 600° and 900° C., preferably from 700° through 800° C. has been reached. In the third version, the holding time is inserted when the first intermediate temperature has been reached and before the lowering of the gas pressure.

The finished phosphor ceramic bodies are now removed from the die and are charged with x-radiation under various conditions in order to define their luminescent properties.

Compared to a phosphor ceramic that was manufactured completely according to the method of the aforementioned German application, the inventively manufactured phosphor ceramic exhibits enhanced translucency. Under the influence of x-radiation, i.e. given employment as a phosphor, this leads to a luminescent intensity increased by 5 through 10% that arises due to the less disturbed (diffused), internal light propagation within the phosphor ceramic.

The density of the phosphor ceramic reaches more than 99.9% of the theoretical density.

Due to the improved luminescent properties, the phosphor of the invention is particularly suited for employment in an x-ray computed tomography apparatus for detection of x-rays.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for manufacturing a phosphor ceramic having the general sum formula $(M_{1-x}Ln_x)_2O_2S$, wherein M is at least one element of the group consisting of Y, La and Gd, Ln is at least one element of the group consisting of Eu, Ce, Pr, Tb, Yb, Dy, Sm and Ho, and wherein $(2\times10^{-1}) \leq x \leq (1\times 10^{-6})$, comprising the steps of:

preparing a phosphor powder having the composition $(M_{1-x}Ln_x)_2O_2S$ and having a specific surface (measured with a gas adsorption method according to BET) of at least 10 $m^2/g$;

single-axis hot-pressing the phosphor powder in a pressing die at a pressure in a range from 0.1 through 10 $kN/cm^2$ and at a temperature in a range from 1000° through 1500° C. in a reducing atmosphere and at a gas pressure in a range from 0.1 Pa through 0.1 MPa.

2. A method as claimed in claim 1 wherein Ln is Ce and at least one further element from the group consisting of Tb, Pr and Eu.

3. A method as claimed in claim 1 said gas pressure is a constant pressure in a range between 5 Pa and 100 Pa.

4. A method for manufacturing a phosphor ceramic having the general sum formula $(M_{1-x}Ln_x)_2O_2S$, wherein M is at least one element of the group consisting of Y, La and Gd, Ln is at least one element of the group consisting of Eu, Ca, Pr, Tb, Yb, Dy, Sm and Ho, and wherein $(2\times10^{-1}) \leq x \leq (1\times 10^{-6})$, comprising the steps of:

preparing a phosphor powder having the composition $(M_{1-x}Ln_x)_2O_2S$ and having a specific surface (measured with a gas adsorption method according to BET) of at least 10 $m^2/g$;

single-axis hot-pressing the phosphor powder with a continuously increasing temperature in a pressing die at a pressure in a range from 0.1 through 10 $kN/Cm^2$ in a reducing atmosphere in successive first and second phase by hot-pressing said phosphor powder in said first phase in a temperature range from 700° through 1000° C. in said reducing atmosphere at a gas pressure in range from 0.1 through 50 Pa, and subsequently heating said phosphor powder in said second phase in a temperature range from 1100° through 1500° C. in said reducing atmosphere at a gas pressure in range from 500 Pa through 0.1 MPa.

5. A method as claimed in claim 4 comprising the additional step of holding said phosphor powder in said first phase at a temperature in a range from 600° through 800° C. for up to 120 minutes during hot-pressing of said phosphor powder.

6. A method as claimed in claim 1 wherein the step of hot-pressing of said phosphor powder includes the step of elevating the temperature during hot-pressing at a rate of 1 through 5 K./min.

7. A method as claimed in claim 1 wherein the step of hot-pressing of said phosphor powder includes reaching a maximum temperature and holding said phosphor powder in a range of 30 through 240 minutes at said maximum temperature to produce a hot-pressed product, and cooling said hot-pressed product.

8. A method as claimed in claim 7 wherein the step of cooling said hot-pressed product comprises cooling said hot-pressed product at a cooling rate in a range from 3 through 10 K./min.

9. A method as claimed in claim 1 wherein the step of hot-pressing said powder ceramic includes heating said ceramic powder at a rate in a range from 3 through 4 K./min to produce a hot-pressed product and comprising the step of cooling said hot-pressed product at a cooling rate in a range from 4 through 5 K./min.

10. A method as claimed in claim 1 said reducing atmosphere is selected from at least one gas in the group consisting of forming gas, hydrogen, hydrogen sulfite and carbon monoxide.

* * * * *